(12) United States Patent
Bromberg et al.

(10) Patent No.: US 7,679,374 B2
(45) Date of Patent: Mar. 16, 2010

(54) MICROWAVE SENSING FOR DETERMINATION OF LOADING OF FILTERS

(75) Inventors: Leslie Bromberg, Sharon, MA (US); Alex Sappok, Cambridge, MA (US); Ronald Parker, Belmont, MA (US); Peter Koert, Boston, MA (US); Victor Wong, Peabody, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 28 days.

(21) Appl. No.: 11/741,832

(22) Filed: Apr. 30, 2007

(65) Prior Publication Data

US 2008/0059093 A1    Mar. 6, 2008

Related U.S. Application Data

(60) Provisional application No. 60/746,081, filed on May 1, 2006.

(51) Int. Cl.
*G01R 27/04* (2006.01)
(52) U.S. Cl. .......................... 324/637; 324/641; 60/275; 60/311
(58) Field of Classification Search ................ 324/637
See application file for complete search history.

(56) References Cited

U.S. PATENT DOCUMENTS

| | | | | |
|---|---|---|---|---|
| 4,024,452 A * | 5/1977 | Seidel | ........................... | 363/16 |
| 4,042,879 A | 8/1977 | Ho et al. | | |
| 4,477,771 A * | 10/1984 | Nagy et al. | .................. | 324/636 |
| 5,142,595 A | 8/1992 | Chester | | |
| 5,157,340 A | 10/1992 | Walton et al. | | |
| 5,369,369 A * | 11/1994 | Cutmore | ...................... | 324/637 |
| 5,497,099 A | 3/1996 | Walton | | |
| 5,500,599 A * | 3/1996 | Stange | ........................ | 324/634 |
| 6,147,503 A | 11/2000 | Nelson et al. | | |
| 6,507,308 B1 * | 1/2003 | Ono et al. | ...................... | 342/20 |
| 6,819,849 B1 | 11/2004 | Tangonan et al. | | |
| 7,157,919 B1 * | 1/2007 | Walton | ........................ | 324/641 |
| 7,357,822 B2 * | 4/2008 | Hamahata et al. | .............. | 55/283 |
| 2004/0200198 A1 * | 10/2004 | Inoue et al. | ................. | 55/282.3 |
| 2007/0209333 A1 * | 9/2007 | Kondou | ...................... | 55/282.3 |
| 2008/0066621 A1 * | 3/2008 | Naito et al. | ..................... | 96/55 |
| 2008/0092499 A1 * | 4/2008 | Otsuka et al. | ................. | 55/307 |

FOREIGN PATENT DOCUMENTS

| | | |
|---|---|---|
| EP | 0356040 | 2/1990 |
| WO | WO-9202807 | 2/1992 |
| WO | WO-2004074670 | 9/2004 |

OTHER PUBLICATIONS

International Search Report, PCT/US07/67750, mailed on Feb. 19, 2008.
Written Opinion of the International Searching Authority, PCT/US07/67750, mailed on Feb. 19, 2008.

* cited by examiner

*Primary Examiner*—Timothy J Dole
*Assistant Examiner*—Benjamin M Baldridge
(74) *Attorney, Agent, or Firm*—Nields, Lemack & Frame, LLC

(57) ABSTRACT

Method for determining loading of a filter. The filter has a first dielectric constant. The filter becomes loaded with contaminant material that has a second dielectric constant. The filter, such as a diesel particulate filter, is contained within a metallic enclosure forming a microwave cavity. The method includes establishing microwave energy in the cavity and monitoring changes in the cavity microwave response, the changes being related to filter loading.

31 Claims, 3 Drawing Sheets

MICROWAVE SENSING FOR DETERMINATION OF LOADING OF FILTERS

This application claims priority to Provisional Application Ser. No. 60/746,081 filed May 1, 2006, the contents of which are incorporated herein by reference.

BACKGROUND OF THE INVENTION

This invention relates to determination of filter loading and more particularly to the use of microwave sensing to determine filter loading.

In many realms there is a need for accurate sensing of the amount of material that has been captured by a filter. An example is the need to determine filter loading of soot on a diesel particulate filter (DPF). The amount of loading on a diesel particulate filter must be known in order to determine appropriate conditions for start-up of regeneration as well as monitoring conditions to determine when complete regeneration has been achieved. The level of loading is important in this context because regeneration of a DPF is often through an uncontrolled burn in which soot is ignited by the presence of free oxygen and a combustion wave is generated through the filter. Under certain conditions, it is possible that regeneration will produce temperatures that are very high resulting in large thermal stresses that can result in limited fatigue life of the filter and ultimately its destruction. Thus, the level of soot loading is important for successful filter regeneration.

It is well known that there are several methods for determining the loading of a filter. The most commonly investigated method is by measurement of the pressure drop across the filter. This method can be combined with expert systems that calculate the amount of soot that has been captured through a cumulative calculation of soot production through an engine.

An object of the present invention is the application of microwave technology to the determination of the status of loading of traps or filters.

SUMMARY OF THE INVENTION

The method according to the invention for determining loading of a filter having a first dielectric constant with contaminant material having a second dielectric constant, the filter contained within a metallic container forming a microwave cavity, includes establishing microwave energy in the cavity and monitoring changes in the cavity microwave response. It is necessary that the second dielectric constant be different from that of the media which the contaminant material is displacing, usually air, exhaust gases or a fluid. The changes in cavity microwave response are related to filter loading. In a preferred embodiment, the microwave energy includes multiple cavity modes thereby allowing determination of spatial distribution of the contaminant material loading.

In a preferred embodiment, the microwave cavity response includes a shift in frequency of a resonant mode. Alternatively, the microwave cavity response includes a shift in quality factor Q of a resonant mode. The microwave cavity response may include a shift in amplitude of the microwave's signal at resonance.

It is preferred that at least one antenna be used to transmit/receive microwave energy. In a preferred embodiment, one antenna only is used in a reflection mode to transmit/receive the microwave energy. Two antennas may be used in a transmission mode with one antenna transmitting and the other antenna receiving. Instead of an antenna, at least one waveguide may be used to transmit/receive the microwave energy. In an embodiment, one waveguide is used in reflection mode to transmit/receive the microwave energy. Alternatively, two waveguides may be used in transmission mode with one waveguide transmitting and the other wav guide receiving.

In an important embodiment, the filter is a diesel particulate trap for removing particulate matter from the exhaust of a diesel engine. The particulate matter may be soot.

In still another embodiment, the metallic container includes a cylindrical portion between two transition cones, one of which is connected to an exhaust pipe. The microwave energy may be in the S-band. A preferred filter material is cordierite. Another suitable filter material is silicon carbide. It is preferred that both low order and high order cavity modes are used to monitor trap loading. In this embodiment, it is preferred that the frequency of operation be chosen so that the modes are operating at cutoff at reduced size inlet and outlet pipes of the filter.

When two antennas or waveguides are used, they may be located on opposite sides of the filter or on the same side of the filter. It is preferred that the antennas and waveguides be located on the downstream side of the filter to prevent contamination.

The microwave energy may be provided by a modified microwave chip and the microwave energy may be monitored by a diode with or without amplification. Cavity monitoring may use lock-in detection or hetereodyne detection.

DESCRIPTION OF THE PREFERRED EMBODIMENT

Figure 1:
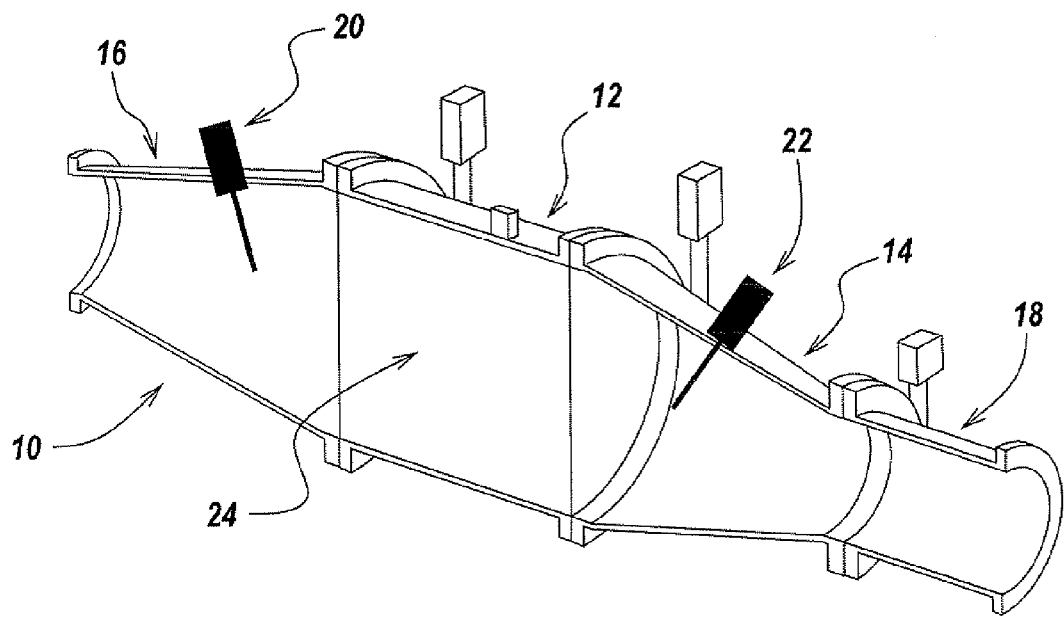
FIG. 1 is a perspective view of a canned diesel particulate filter according to an embodiment of the invention.

The present invention is based on the recognition that microwaves can be used to determine the status of loading of traps or filters. The loading may be soot, particulates, ash or any solid/liquid. In addition to determining the total amount of loading, the microwave system to be described herein is useful in determining the distribution of the loading throughout the trap. The microwave sensing used in this invention can be inexpensive as inexpensive oscillators and detectors in the frequency range of interest are commercially available.

In the case of a diesel particulate filter, the particulates are made from soot and other organic compounds (solid and/or liquid), and ash. For the purposes of this disclosure, the combination of carbon, organic compounds and ash will be referred to, for simplicity, as soot. Those of skill in the art will recognize that soot and organic compounds are removed through regeneration but ash loading will remain.

Usually, diesel particulate filter units are made of cordierite material which has a dielectric constant at frequencies around S-band, slightly higher than 4, with a weak temperature dependence. The effective dielectric constant of the cordierite filter, which is mainly void with a fraction of cordierite, is around 1.5-1.7, and it is slightly anisotropic because of the orientation dependence of the trap. The presence of soot (which can be as much as 10 g/liter of trap, with the size of the trap being about two liters for 5.66 inch traps) changes the microwave characteristics of the microwave cavity, as the soot has a dielectric constant that is different from the gas (air or exhaust) that it displaces. Thus, the maximum soot loading for this trap could be as high as 20 g with a volume of about 20 $cm^3$. This amount of soot corresponds to a substantial volume and a correspondingly large change in the dielectric characteristics of the trap. It is noted that the dielectric constant of some types of soot is approximately 2.

Silicon carbide is also suitable for the manufacture of a diesel particulate filter. The microwave properties of silicon carbide also make it suitable for the use of microwaves for loading sensing. Those skilled in the art will recognize that the microwave load sensing technology disclosed herein can be used, for example, to determine the loading of fiber filters (organic and inorganic fibers), such as those used in baghouses, and in other applications where substantial masses/volumes of materials that have non-unity dielectric constants are collected.

Ash content, which is not removed through regeneration, can be monitored if substantial ash amounts build with time on the trap.

Low order cavity modes as well as high order modes can be used to monitor the trap loading. Different cavity modes have different electric field patterns with peaks and nulls that vary across the volume. Since for a given cavity mode only the presence of soot in those regions with high electric field affects the microwave response in the cavity. By choosing different modes in the cavity it is possible to sample different regions and thus obtain information on the soot distribution.

The theory on which the present invention is based will now be discussed briefly. The presence of soot affects the cavity response in several ways. The resonant frequency shifts to lower frequencies with soot buildup. In addition, the cavity quality Q is affected by the presence of absorbing soot. Further, the amplitude of the signal at resonance decreases with soot buildup. All three of these parameters can be used to determine the soot level. Several modes can be used to monitor the loading in various regions of the diesel particulate filter.

The invention will now be described in conjunction with the figures. With reference first to FIG. 1, a diesel particulate filter unit 10 includes a metallic cylinder (referred as the can) portion 12 and transition cones 14 and 16. The cone 14 connects to an exhaust pipe 18. In this embodiment, a pair of rod antennas 20 and 22 are located on opposite sides of a filter 24.

Because of the conical transition sections 14 and 16, the frequency of operation can be chosen so that the modes are operating below cutoff at the small inlet and outlet pipes of the trap, with the frequency such that the modes are operating below cutoff on main exhaust pipe 18. It is not necessary to provide screens to confine the microwave radiation. In the embodiment of FIG. 1, one of the conventional rod antennas, 20 and 22, serves as a transmitter and the other serves as a receiver. It should be understood that both of the rod antennas 20 and 22 could be located on the same side of the filter 24 rather than flanking it. In this case, the preferred location for the rod antennas 20 and 22 will be downstream from the filter element 24 to minimize soot on the surface of the transmitter, receiver or associated components.

Figure 2:
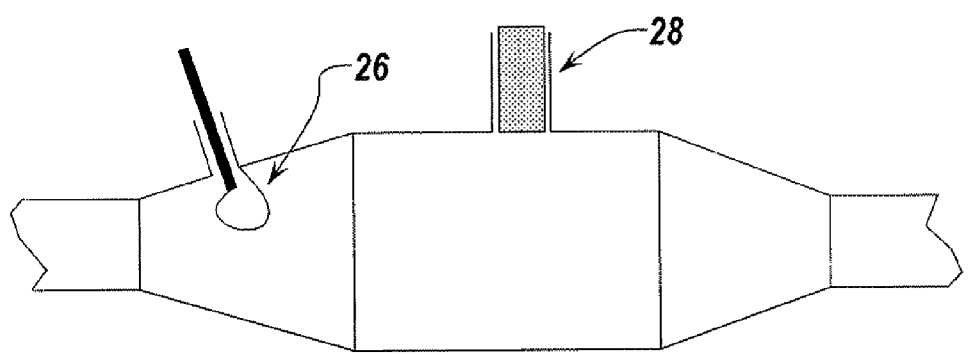
FIG. 2 is a cross-sectional view of another embodiment of the invention.

With reference now to FIG. 2, it is possible to implement the transmitter through the use of a loop antenna 26, or through the use of a waveguide 28. The waveguide 28 will likely be filled with a high dielectric material. It is also contemplated to use the loop antenna 26 and/or the waveguide 28 to monitor the radiation by acting as receiving antennas.

It is possible to use a single antenna (rod or loop), as well as a single waveguide, or to use two antennas or waveguides. In the case of a single antenna/waveguide, the information is in the reflected signal. In the case of separate antennas/waveguides for transmitter/receiver it is possible to choose between reflection or transmission modes. In the case of two antennas/waveguides, there are four elements in the coupling matrix that could be used to determine soot loading: transmission from one antenna/waveguide to the other, the reverse, and reflection in each antenna/waveguide.

As shown in FIG. 2, one suitable location of the transmitter and/or receiver is in the central region of the filter. This location illustrates a clear advantage of the microwave system disclosed herein as the waves penetrate through the external surface of the filter and a sensor can thus be protected from soot deposition by the external walls of the filter. This arrangement can be done for either single or double waveguides, loop antennas or rod antennas.

Figure 3:
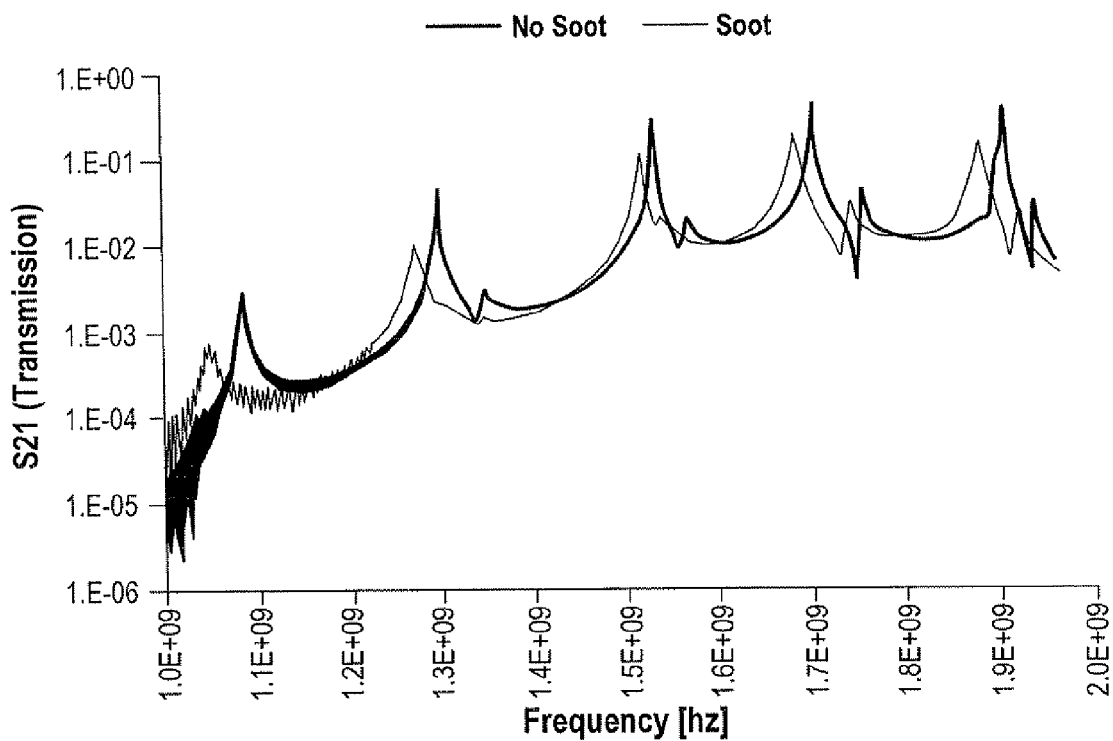
FIG. 3 is a graph of experimentally determined S21 transmission as a function of frequency (magnitude of S21 is shown).
Figure 4:
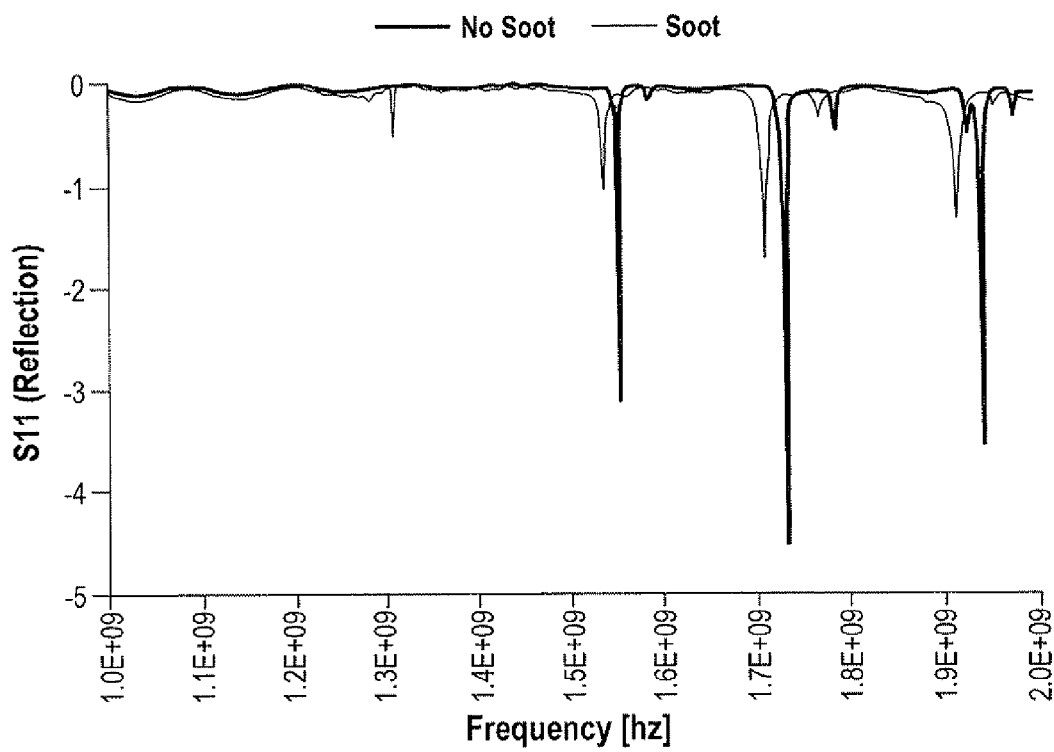
FIG. 4 is a graph of experimentally determined S11 (reflection) response as a function of frequency.
Figure 5:
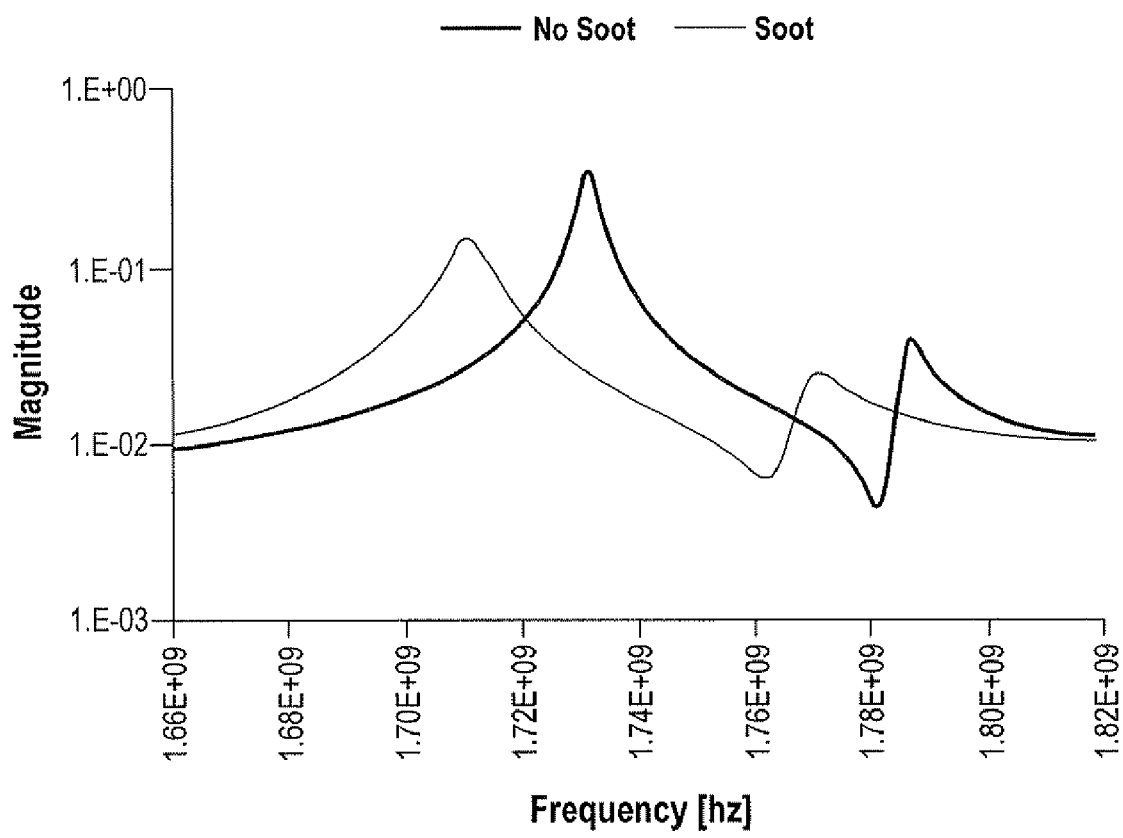
FIG. 5 is a graph showing an expanded view of the transmission mode of FIG. 3.

In operation, microwave energy is established within the cavity of the device 10. There are a large number of modes that can be used to determine the trap loading. FIG. 3 shows the transmission element S21 as a function of frequency and FIG. 4 shows the reflections from a single launcher/receiver system. In FIG. 3 rod antennas were on opposite sides of the trap as shown in FIG. 1. The graph in FIG. 4 was created with a single antenna and the information is in the reflected signal. FIG. 5 is an expanded view of the transmission mode from FIG. 3 and shows detail around the mode near 1.7 GHz. One can readily see how the graph changes from no soot to soot. It is this difference that allows a determination of trap loading to be determined.

The microwave sensing system disclosed herein can use inexpensive components with the microwave source being a modified microwave chip such as those used in cell phones, and the receiver can be a simple diode with or without amplification. The detection system can use advanced detection systems such as lock-in detection, heterodyne detection and others.

Although the loading has been assumed to be of soot (as from a diesel engine), any matter that builds in a substantial amount on the surface of a filter can be measured as long as it has a dielectric constant different from the background filter material (one in the case of air/engine exhaust).

The system can be used to monitor the health of the trap. When substantial cracks are present in the system, soot distribution changes, and becomes inhomogeneous.

In addition, it may be possible to use the temperature dependence of the cordierite to monitor temperature across the trap.

Although the description refers to the use of a single DPF in the can, the approach is also applicable to the case of multiple filters in a single can.

The filtering monitoring system can be either original equipment, as well as be used as refrofits.

It is recognized that modifications and variations of the invention will occur to those of ordinary skill in the art and it is intended that all such modifications and variations be included within the scope of the appended claims.

What is claimed is:

1. A method for determining loading of a particulate filter, wherein the filter is a particulate trap for removing particulate or contaminant matter from the exhaust of an engine, said filter having a first dielectric constant, and said particulate or contaminant material having a second dielectric constant that differs from a dielectric constant of the media which it displaces, the filter contained within a metallic container forming a microwave cavity, the method comprising:

establishing microwave energy in the cavity; and monitoring changes in quality factor, Q, of a resonant mode in the microwave cavity; and determining particulate filter loading based on the monitored changes in quality factor Q of the microwave cavity.

2. The method of claim 1, wherein one antenna is used in reflection mode to transmit microwave energy to the cavity, and receive microwave energy from the cavity.

3. The method of claim 2, wherein the antenna is a rod antenna.

4. The method of claim 2 wherein the antenna is a loop antenna.

5. The method of claim 1, wherein two antennas are used in transmission mode, with one antenna transmitting microwave energy to the cavity, and the other antenna receiving microwave energy from the cavity.

6. The method of claim 5 wherein the two antennas are located on opposite sides of the filter.

7. The method of claim 5 wherein the two antennas are located on the same side of the filter.

8. The method of claim 5 wherein the antennas are located on the downstream side of the filter.

9. The method of claim 5, wherein at least one of the two antennas is a rod antenna.

10. The method of claim 5, wherein at least one of the two antennas is a loop antenna.

11. The method of claim 1, wherein one waveguide is used in reflection mode to transmit and receive the microwave energy.

12. The method of claim 11 wherein the waveguide includes a dielectric material contained therein.

13. The method of claim 1, wherein two waveguides are used in transmission mode, with one waveguide transmitting microwave energy to the cavity and the other waveguide receiving microwave energy from the cavity.

14. The method of claim 13, wherein at least one of the waveguides includes a dielectric material contained therein.

15. The method of claim 1 wherein the filter is a diesel particulate trap for removing particulate matter from the exhaust of a diesel engine.

16. The method of claim 1, wherein the particulate or contaminant matter is soot.

17. The method of claim 1, wherein the particulate or contaminant matter is ash.

18. The method of claim 1 wherein the metallic container includes a cylindrical portion between two transition cones, one of which is connected to an exhaust pipe.

19. The method of claim 18 wherein frequency of operation is chosen so that modes are operating at cutoff at small inlet and outlet regions of the filter.

20. The method of claim 1 wherein the microwave energy is S-band.

21. The method of claim 1 wherein the filter material is cordierite.

22. The method of claim 1 wherein the filter material is silicon carbide.

23. The method of claim 1 wherein both low-order and high-order cavity modes are used to monitor loading.

24. The method of claim 1, wherein the microwave energy is monitored by a diode detector with or without amplification.

25. The method of claim 1, wherein the microwave monitoring indicating a state of soot loading is used to initiate filter regeneration.

26. The method of claim 1, wherein the microwave monitoring is used to control filter regeneration.

27. The method of claim 1, wherein the microwave monitoring is used to determine the quantity of ash in the filter.

28. The method of claim 1, wherein the microwave monitoring is used to determine the health of the filter through determination of anomalous soot buildup or lack thereof.

29. The method of claim 1, wherein the microwave monitoring is used to determine a temperature of the filter, when the dielectric constant of the filter or contaminant material is a function of temperature.

30. The method of claim 29 wherein filter temperature is used as an indication of the health of the filter.

31. A microwave particulate filter loading sensing system kit having component parts capable of being assembled and installed in the field, wherein the filter is a particulate trap for removing particulate or contaminant matter from the exhaust of an engine, the kit comprising:

a particulate filter contained within a housing that forms a microwave cavity; and one or more antennas to be installed in or on the housing, for monitoring changes in microwave cavity response, the changes being related to filter loading, a microwave generator and detector to determine a quality factor Q of the cavity; and processing circuitry to determine the filter loading by computing the quality factor Q of the signal at a resonant mode and monitoring changes in said quality factor Q.

* * * * *